Aug. 31, 1943.  J. C. LANG  2,328,023
BLIND RIVET
Filed May 16, 1942

INVENTOR
Joseph C. Lang
BY Christy, Parmelee and Strickland
ATTORNEYS

Patented Aug. 31, 1943

2,328,023

UNITED STATES PATENT OFFICE 2,328,023

BLIND RIVET

Joseph C. Lang, Pittsburgh, Pa., assignor to Bocji Corporation, a corporation of Delaware Application May 16, 1942, Serial No. 443,198

8 Claims. (Cl. 85—38)

This invention relates to fasteners and particularly to fasteners of the type which are known as blind rivets.

Rivets are extensively used in joining metal members. Ordinary rivets are inserted from one side of the structure and the projecting ends are upset on the other side of the structure. In this case a backing up tool is used against the head of the rivet while the projecting end is upset or peened over to secure the rivet. In many cases however, where it is desired to use rivets it is impossible to have access to both surfaces of the structure in which the rivets are being driven so that a backing up tool can not be used on one end while the other end of the rivet is being upset. All operations on such rivets have to be performed at that surface of the work from which the rivet is inserted. Obviously, conventional rivets can not be used in such circumstances and fasteners have heretofore been devised for use in such situations and they are commonly referred to in the art as "blind rivets."

Heretofore various blind rivets have been designed which are hollow and which have slotted terminal portions at the one end thereof and have a head at the other. These rivets are expanded or set by driving some kind of a wedging element through the rivet to bend the slotted terminal portions outwardly. On the whole, such devices have not been commercially accepted. One objection is that the element which wedges or expands the rivet is not permanently secured in place and can drop out, leaving a hole through the rivet which is obviously undesirable. Another objection to such forms of rivets has been that when the ends of the rivet are bent outwardly by the expanding wedge they break off. Other forms of blind rivets embody a sleeve member through which passes a rod or screw having a head at the inner end thereof. When tension is applied to this rod or screw from the outside of the structure to which the rivet is placed, the head, acting against the end of the rivet, upsets the end of the rivet, thereby setting it. Such rivets require special tools for their operation. The sleeve member has to be held tightly in the work while the inner member or rod is pulled outwardly. The inner member or rod has to be broken off or cut off after the rivet has been set and unless it is threaded into the sleeve member, is not permanently retained in the rivet. Moreover, such rivets give no assurance that they have been adequately set as it is impossible to gauge the extent to which the inner end of the rivet has been expanded.

According to the present invention, there is provided a blind rivet of simple construction which can be driven from the exterior of the structure into which the rivet is placed, by either a conventional hand hammer or a mechanical hammer similar to riveting hammers now commonly employed. After the rivet has been set, all parts of it are positively engaged with the structure into which the rivet is driven. Also, when the rivet has been set the operator has assurance that the inner end is in a proper condition to adequately hold the parts which are riveted together.

The rivet of the present invention has an outer sleeve member with a head at one end thereof and with a well or passageway therein. At the bottom of this well are diagonal or laterally directed openings, the inner end of the well being closed except for these openings. There is provided a forked pin member, the diameter which is such that it snugly fits in the well. When the rivet has been placed in the pieces to be secured together, the end of this inner member is tapped with a hammer. The bifurcated portions on the other end of the member are forced through the diagonal openings, being deflected laterally, the extreme inner end portion of the outer member itself constituting an anvil for thus deflecting the ends of the inner member. In being thus deflected the rivet is set and also the outer member is expanded to some extent so that the rivet tightly fills the hole in which it is driven. Once the rivet has been set the inner member is permanently retained in the assembly. When the outer end of the inner member is flush with the head of the outer member the operator knows that the rivet has been completely set.

My invention may be more fully understood by reference to the accompanying drawing in which.

Figure 1:
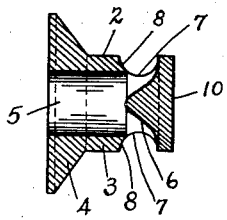
Figure 1 is a longitudinal section through the outer member of the rivet assembly.
Figure 3:
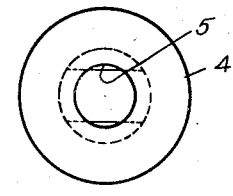
Figure 3 is a top end view of the member shown in Figure 1.

In the drawing, 2 designates generally the outer or rivet-like sleeve member of the assembly. It comprises a shank portion 3 and a head portion 4. Centrally located in the member 2 is a well or bore 5 which opens through the head of the rivet and which is almost, but not entirely coextensive with the length of the rivet. If it is formed by a drilling operation the inner end or bottom of the well may be generally in the form of a cone as shown in Figure 1, this cone being designated 6. Opening through the shank of the member 2 adjacent the inner or bottom end of the well or bore 5 are diametrically opposed openings 7. These openings may be formed in a number of ways, as for example by holding the sleeve member in a suitable jig while a pair of drills moves across the end portion of the rivet in a tangential direction, in which case there is formed a rounded edge at 8 where the transverse bore intersects the longitudinally extending hole. The closed end portion of the outer member is designated 10.

Figure 2:
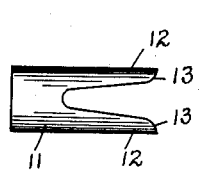
Figure 2 is a side elevation of the bifurcated inner member.

The inner or pin member designated generally as 11 is of circular cross section and has a diameter sufficient to have a close working fit in the bore or well 5 of the outer member. The inner end of the member 11 is bifurcated as shown in Figure 2 providing two tapering legs or tongues 12, the ends of these legs preferably being bluntly rounded as indicated at 13.

Figure 6:
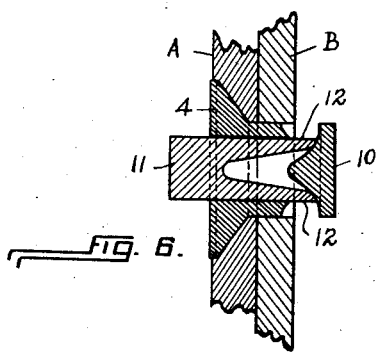
Figure 6 shows the assembly in place in a structure to be riveted with the parts in the position that they occupy before the rivet has been set.
Figure 7:
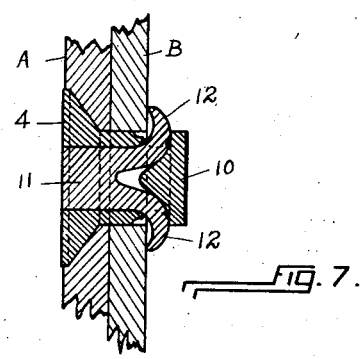
Figure 7 is a similar view in which the rivet has been set, both Figures 6 and 7 being longitudinal sections through the rivet.

In use, the pin member 11 is inserted in the hole 5 as shown in Figure 6, with the inner ends of the legs 12 extending across the openings 7. The assembled structure is then inserted in the registering holes in the overlapping sheets or plates to be riveted, these sheets or plates being designated A and B. The plate A is indicated as being counter-sunk to receive the head of the outer member. When the assembled fastener has thus been placed in the registering holes the outer projecting end of the pin is hit with a hammer to drive it inwardly. It is preferred that the pin be hit a number of light blows in succession rather than being hit a single heavy blow. As a matter of fact, there frequently may be insufficient backing behind the plate B to permit heavy impact. An ordinary hammer may be used or an air or electric riveting hammer. As the pin is driven inwardly the terminal portions of the legs are deflected outward through the holes 7, the end portion 10 of the rivet with its conical surface 6 acting as an anvil to deflect the ends. When the end of the pin is flush with the outer face of the head of the rivet as shown in Figure 7 the rivet will be completely set, the terminal portions of the legs then projecting through the openings 7 and overlying the inner face of the plate B. In being forced outwardly the legs exert a radial pressure on the lip portions 8, tending to roll them out, thus creating an expanding force or pressure on the sleeve member itself so as to tighten the rivet in the plates.

Once the rivet has been set it is permanently locked in place. The inner member or pin can not move inwardly because of the closed end portion 10 of the outer member and it can not move longitudinally out because it is prevented from so doing by the clinched ends of the legs 12. The rivet will thus effectively secure the two plates together and its two parts will be locked against separation. The end portion 10 of the outer member provides the anvil to accomplish the upsetting or expanding of the pin so that it is unnecessary to have any anvil or other means of backing up the inner end of the fastener and it can be successfully used in all places where a blind rivet is required. It is of course necessary that the shank 3 of the outer member 2 be of an appropriate length, depending upon the thickness of the sheets A and B.

In the modification shown in Figures 8, 9, 10 and 11 the structure is essentially the same as the one previously described, except that holes through the sides of the rivet near the inner end are indicated as being kerfs cut in a diagonal direction. Also, in this modification the pin member is provided with a slight head. This has an advantage in that if the inner end of the outer member should, after the setting of the rivet, break away, the head on the pin member will prevent the pin from moving longitudinally inwardly while the clinched ends of the legs will prevent the pin member from moving longitudinally outwardly.

Figures 8, 9:
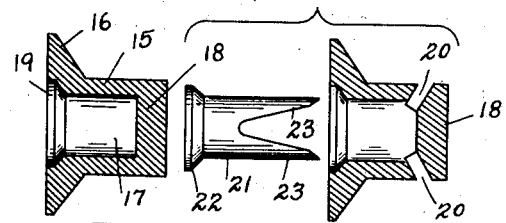
Figure 8 is a view showing a modification of the inner and outer member, the parts being separated for better illustration.
Figure 9 is a longitudinal section through the outer member of the modification shown in Figure 8 before the kerfs have been formed therein.

In Figure 9 the outer member is illustrated before the kerfing has been performed. It has a shank portion 15 with a head portion 16. There is an axial bore or well 17 which opens through the head of the rivet, leaving a relatively thick wall 18 at the end of the outer member. The head end of the bore 17 is countersunk at 19. The kerfs, designated 20, and best shown in Figure 8, are at diametrically opposite sides of the inner end of the shank and extend in a slightly diagonal direction. The pin member 21 has a slight head 22 on its outer end and its inner end is bifurcated, forming two legs 23.

Figure 4:
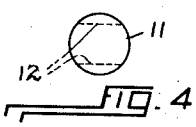
Figure 4 is a top end view of the member shown in Figure 2.
Figure 5:
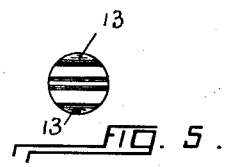
Figure 5 is an inner end view of the member shown in Figure 2.
Figure 11:
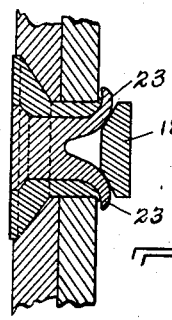
Figure 11 is an assembly view showing the rivet of Figure 8 after it has been set.
Figure 10:
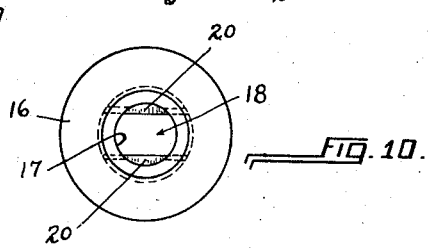
Figure 10 is a top view of the outer member shown in Figure 8.

The rivet shown in Figures 9 to 11 inclusive is used the same as the rivet described in Figures 4 and 5. As above indicated, when it is fully driven so that the head 22 on the pin is in the counter-sink 19 (the parts then being in the position shown in Figure 11) the ends of the legs of the pin member will be clinched. It will also be seen that after the rivet has been set the pin member can not come out even though the end portion 18 should subsequently break away.

From the foregoing it will be seen that the present invention provides a blind rivet which may be conveniently used wherever a riveting operation is required and which does not require any special tool or equipment for setting it. Once it has been set it has great holding power and the two parts of the assembly are interlocked with each other and with the parts which are riveted to prevent their separation.

After the rivet has been set it is completely weather tight. Moreover, after being set it is unnecessary to file or finish the head end of the rivet, as is the case with most present types of blind rivets. It will be further understood that the lateral openings in the rivets may be made in other ways than herein described, and that either of the two forms of rivets illustrated may have the openings formed in the way illustrated in the other.

While I have illustrated and described certain specific embodiments of my invention it will be understood that various changes and modifications may be made in the construction of the various parts within the contemplation of my invention and under the scope of the following claims.

I claim:

1. A blind rivet comprising telescopically interfitted pin and sleeve members, the former having a bifurcated inner end, the latter having an anvil portion at its inner end and having opposed laterally directed openings immediately forward of the anvil portion, the major portion of the openings being so located that they are just below the inner surface of the object into which the rivet is entered.

2. A blind rivet comprising telescopically interfitted pin and sleeve members, the former having a bifurcated inner end, the latter having a head portion at its outer end and having an anvil portion at its inner end and also having opposed laterally directed openings immediately forward of the anvil portion, the major portion of the openings being so located that they are just below the inner surface of the object into which the rivet is entered.

3. A blind rivet comprising telescopically interfitted pin and sleeve members, the former having a bifurcated inner end, the latter having a head portion at its outer end and having an anvil portion at its inner end and also having opposed laterally directed openings immediately forward of the anvil portion, the pin member also having a head at its outer end, the head of the sleeve member being recessed to receive the head of the pin member, the major portion of the openings being so located that they are just below the inner surface of the object into which the rivet is entered.

4. A blind rivet comprising a headed rivet-like member having a well extending into it from the head end and having opposed laterally directed openings therein adjacent the closed end of the well, and a pin member having a bifurcated end entered into the well and arranged to have the bifurcated portions thereof deflected outwardly through the openings when the pin member is hammered.

5. A blind rivet comprising a headed rivet-like member having a well extending into it from the head end and having opposed laterally directed openings therein adjacent the closed end of the well, and a pin member having a bifurcated end entered into the well and arranged to have the bifurcated portions thereof deflected outwardly through the openings when the pin member is hammered, the inner portion of the inner end of the rivet adjacent said openings being shaped to facilitate the deflection of the bifurcated ends of the pin member, the openings being so located with reference to the length of the rivet that the deflected ends of the pin member will lie against the inner surface of the object in which the rivet is entered.

6. A blind rivet comprising a headed rivet-like member having a well extending into it from the headed end and having opposed laterally directed openings therein adjacent the closed end of the well, and a pin member having a bifurcated end entered into the well and arranged to have the bifurcated portions thereof deflected outwardly through the openings when the pin member is hammered, the pin and bifurcated portion thereof being of such length that when the outer end of the pin is flush with the surface of the head of the rivet-like member the ends of the bifurcated portion projecting through said openings will extend beyond the minimum diameter of the rivet-like member, the openings being so located with reference to the length of the rivet that the deflected ends of the pin member will lie against the inner surface of the object in which the rivet is entered.

7. A blind rivet comprising an outer member of rivet-like form having a central well extending into it from the head end thereof, the inner end of the rivet-like member being closed, the rivet-like member having opposed laterally directed openings at the inner end of the well and a pin member of a length greater than the depth of the well having the inner end thereof bifurcated to provide two legs, the closed end of the rivet-like member serving as an anvil to deflect the legs of the pin member outwardly through said openings when the outer end of the pin member is hammered, the openings being so located with reference to the length of the rivet that the deflected ends of the pin member will lie against the inner surface of the object in which the rivet is entered.

8. For use in assembling articles to be riveted together, a blind rivet comprising a rivet-like outer member of a length such that it will pass through the articles to be riveted, the outer member having a head thereon to bear against one surface of the articles to be riveted and having an axial bore therein opening through the head end thereof, a pin member in the bore having a plurality of leg portions on its inner end, the inner end of said bore being closed by means of a deflecting anvil element, the outer member having laterally directed openings adjacent said anvil element through which the legs of the pin member can be forced, the openings being so located that the said leg portions are directed outwardly against the inner surface of the articles which are riveted together.

JOSEPH C. LANG.